US010295659B2

(12) United States Patent
Wang et al.

(10) Patent No.: US 10,295,659 B2
(45) Date of Patent: May 21, 2019

(54) ANGLE CALIBRATION IN LIGHT DETECTION AND RANGING SYSTEM

(71) Applicant: SZ DJI TECHNOLOGY CO., LTD., Shenzhen (CN)

(72) Inventors: Ke Wang, Shenzhen (CN); Chenghui Long, Shenzhen (CN); Xiaoping Hong, Shenzhen (CN)

(73) Assignee: SZ DJI Technology Co., Ltd., Shenzhen (CN)

( * ) Notice: Subject to any disclaimer, the term of this patent is extended or adjusted under 35 U.S.C. 154(b) by 0 days.

(21) Appl. No.: 15/785,358

(22) Filed: Oct. 16, 2017

(65) Prior Publication Data
US 2018/0313941 A1    Nov. 1, 2018

Related U.S. Application Data

(63) Continuation of application No. PCT/CN2017/082603, filed on Apr. 28, 2017.

(51) Int. Cl.
*G01S 7/48* (2006.01)
*G01S 7/497* (2006.01)
(Continued)

(52) U.S. Cl.
CPC ............ *G01S 7/497* (2013.01); *G01C 3/08* (2013.01); *G01S 7/4817* (2013.01);
(Continued)

(58) Field of Classification Search
CPC ...... G01S 7/4817; G01S 7/4861; G01S 17/10; G01S 7/487; G01S 17/89; G01S 7/4865; G01S 17/42
See application file for complete search history.

(56) References Cited

U.S. PATENT DOCUMENTS

| 4,283,116 A | 8/1981 | Weis |
| 5,179,565 A | 1/1993 | Tsuchiya et al. |

(Continued)

FOREIGN PATENT DOCUMENTS

| CN | 101216562 A | 7/2008 |
| CN | 101256232 A | 9/2008 |

(Continued)

OTHER PUBLICATIONS

Aijazi, et al., "Segmentation Based Classification of 3D Urban Point Clouds: A Super-Voxel Based Approach with Evaluation," (2013), 27 pages.

(Continued)

*Primary Examiner* — Luke D Ratcliffe
(74) *Attorney, Agent, or Firm* — Perkins Coie LLP

(57) ABSTRACT

Techniques, systems, and devices relating to conducting calibration of LIDAR systems are disclosed. In one exemplary aspect, a light detection and ranging (LIDAR) device is disclosed. The device comprises a light beam emitter operable to emit a light beam; a prism set positioned in an optical path of the light beam to refract the light beam onto a surface of a surrounding object; a light detector to detect light reflected by the surface of the surrounding object; a controller configured to estimate the surface of the surrounding object based on the detected light. The controller is operable to (1) determine a relative bias in the prism set, and (2) cause, based on the relative bias in the prism set, a compensation for an estimation error in the controller's estimation of the surface of the surrounding object.

19 Claims, 14 Drawing Sheets

(51) Int. Cl.
| | |
|---|---|
| *G01S 7/486* | (2006.01) |
| *G01C 3/08* | (2006.01) |
| *G01S 17/42* | (2006.01) |
| *G01S 7/481* | (2006.01) |

(52) U.S. Cl.
CPC .......... *G01S 7/4861* (2013.01); *G01S 7/4972* (2013.01); *G01S 17/42* (2013.01)

(56) References Cited

U.S. PATENT DOCUMENTS

| | | |
|---|---|---|
| 5,249,046 A | 9/1993 | Ulich et al. |
| 6,101,455 A | 8/2000 | Davis |
| 6,246,258 B1 | 6/2001 | Lesea |
| 6,344,937 B1 | 2/2002 | Sparrold et al. |
| 6,666,855 B2 | 12/2003 | Somani et al. |
| 7,085,400 B1 | 8/2006 | Holsing et al. |
| 7,236,299 B1 | 6/2007 | Smith et al. |
| 7,336,407 B1 | 2/2008 | Adams et al. |
| 7,564,571 B2 | 7/2009 | Karabassi et al. |
| 7,843,448 B2 | 11/2010 | Wheeler et al. |
| 7,899,598 B2 | 3/2011 | Woon et al. |
| 8,224,097 B2 | 7/2012 | Matei et al. |
| 8,396,293 B1 | 3/2013 | Korah et al. |
| 8,488,877 B1 | 7/2013 | Owechko et al. |
| 8,503,046 B2 | 8/2013 | Mikkelsen et al. |
| 8,605,998 B2 | 12/2013 | Samples et al. |
| 8,620,089 B1 | 12/2013 | Korah et al. |
| 8,665,122 B2 | 3/2014 | Klepsvik |
| 8,773,182 B1 | 7/2014 | Degani et al. |
| 8,798,372 B1 | 8/2014 | Korchev et al. |
| 9,076,219 B2 | 7/2015 | Cha et al. |
| 9,097,804 B1 | 8/2015 | Silver et al. |
| 9,098,753 B1 | 8/2015 | Zhu et al. |
| 9,128,190 B1 | 9/2015 | Ulrich et al. |
| 9,369,697 B2 | 6/2016 | Kumagai et al. |
| 9,383,753 B1 | 7/2016 | Templeton et al. |
| 9,396,545 B2 | 7/2016 | Fu et al. |
| 9,470,548 B2 | 10/2016 | Ahn et al. |
| 9,584,748 B2 | 2/2017 | Saito |
| 9,644,857 B1 | 5/2017 | Ashgriz et al. |
| 9,659,378 B2 | 5/2017 | Sasaki et al. |
| 2004/0135992 A1 | 7/2004 | Munro |
| 2005/0248749 A1 | 11/2005 | Kiehn et al. |
| 2005/0254628 A1 | 11/2005 | Saladin et al. |
| 2007/0214687 A1 | 9/2007 | Woon et al. |
| 2007/0296951 A1 | 12/2007 | Kuijk et al. |
| 2008/0114253 A1 | 5/2008 | Randall et al. |
| 2008/0319706 A1 | 12/2008 | Uffenkamp et al. |
| 2009/0310867 A1 | 12/2009 | Matei et al. |
| 2010/0271615 A1 | 10/2010 | Sebastian et al. |
| 2011/0285981 A1 | 11/2011 | Justice et al. |
| 2012/0032541 A1 | 2/2012 | Chen et al. |
| 2012/0121166 A1 | 5/2012 | Ko et al. |
| 2012/0170024 A1 | 7/2012 | Azzazy et al. |
| 2012/0170029 A1 | 7/2012 | Azzazy et al. |
| 2012/0248288 A1 | 10/2012 | Linder et al. |
| 2012/0256916 A1 | 10/2012 | Kitamura et al. |
| 2013/0107243 A1 | 5/2013 | Ludwig et al. |
| 2013/0284475 A1 | 10/2013 | Hirabayashi et al. |
| 2013/0329065 A1 | 12/2013 | Haraguchi et al. |
| 2014/0049765 A1 | 2/2014 | Zheleznyak et al. |
| 2014/0071121 A1 | 3/2014 | Russ et al. |
| 2014/0132723 A1 | 5/2014 | More |
| 2014/0368651 A1 | 12/2014 | Irschara et al. |
| 2015/0185313 A1 | 7/2015 | Zhu |
| 2015/0206023 A1 | 7/2015 | Kochi et al. |
| 2015/0219920 A1 | 8/2015 | Ando et al. |
| 2016/0070981 A1 | 3/2016 | Sasaki et al. |
| 2016/0154999 A1 | 6/2016 | Fan et al. |
| 2016/0311528 A1 | 10/2016 | Nemovi et al. |
| 2016/0327779 A1 | 11/2016 | Hillman |
| 2017/0046840 A1 | 2/2017 | Chen et al. |
| 2017/0046845 A1 | 2/2017 | Boyle et al. |
| 2017/0153319 A1 | 6/2017 | Villeneuve et al. |
| 2017/0178352 A1 | 6/2017 | Harmsen et al. |
| 2017/0227628 A1 | 8/2017 | Zheleznyak et al. |
| 2017/0248698 A1 | 8/2017 | Sebastian et al. |
| 2017/0316701 A1 | 11/2017 | Gil et al. |

FOREIGN PATENT DOCUMENTS

| | | | |
|---|---|---|---|
| CN | 202182717 U | 4/2012 | |
| CN | 102508255 A | 6/2012 | |
| CN | 102944224 A | 2/2013 | |
| CN | 102971657 A | 3/2013 | |
| CN | 103257342 A | 8/2013 | |
| CN | 103257348 A | 8/2013 | |
| CN | 103403577 A | 11/2013 | |
| CN | 103499819 A | 1/2014 | |
| CN | 203645633 U | 6/2014 | |
| CN | 103969637 A | 8/2014 | |
| CN | 103983963 A | 8/2014 | |
| CN | 104463872 A | 3/2015 | |
| CN | 104600902 A | 5/2015 | |
| CN | 105517903 A | 4/2016 | |
| CN | 105628026 A | 6/2016 | |
| CN | 105759253 A | 7/2016 | |
| CN | 106019296 A | 10/2016 | |
| CN | 106019923 A | 10/2016 | |
| CN | 106030431 A | 10/2016 | |
| CN | 106063089 A | 10/2016 | |
| CN | 106597414 * | 10/2016 | ............. G01S 7/497 |
| CN | 106093958 A | 11/2016 | |
| CN | 106093963 A | 11/2016 | |
| CN | 106199622 A | 12/2016 | |
| CN | 106597416 A | 4/2017 | |
| CN | 107037721 A | 8/2017 | |
| JP | 63194211 A | 8/1988 | |
| JP | 2002199682 A | 7/2002 | |
| JP | 2005321547 A | 11/2005 | |
| JP | 2015200555 A | 11/2015 | |
| JP | 6076541 B2 | 2/2017 | |
| KR | 101665938 B1 | 10/2016 | |
| WO | 2015148824 A1 | 10/2015 | |
| WO | 2016127357 A1 | 8/2016 | |
| WO | 2016170333 A1 | 10/2016 | |
| WO | 2017021778 A2 | 2/2017 | |

OTHER PUBLICATIONS

Douillard, et al., "On the Segmentation of 3D LIDAR Point Clouds," (2011), 8 pages.
Hackel, et al., "Fast Semantic Segmentation of 3D Point Clouds with Strongly Varying Density," (2016), 8 pages.
Levinson, et al., "Automatic Online Calibration of Cameras and Lasers," (2013), 8 pages.
Liu, et al., "A 3.9 ps. RMS Resolution Time-To-Digital Converter Using Dual-sampling Method on Kintex UltraScale FPGA," (2006), 2 pages.
Montemerlo, et al., "Junior: The Stanford Entry in the Urban Challenge," (2008), 31 pages.
Palka, et al., "A Novel Method Based Solely on FPGA Units Enabling Measurement of Time and Charge of Analog Signals in Positron Emission Tomography," (2014), 6 pages.
Raismian, "Google Cars Autonomous Driving," (2017), 1 pages.
Schwarze, "A New Look at Risley Prisms," (2006), 5 pages.
Tongtong, et al., "Gaussian-Process-Based Real-Time Ground Segmentation for Autonomous Land Vehicles," (2014), 25 pages.
Wu, et al., "Several Key Issues on Implementing Delay Line Based TDCs using FPGA," (2009), 6 pages.
International Searching Authority, "International Search Report and the Written Opinion of the International Searching Authority," PCT Application PCT/CN2017/082603, dated Jan. 22, 2018, 12 pages.
International Searching Authority, International Search Report and the Written Opinion of the International Searching Authority, PCT Application PCT/CN2017/078611, dated Dec. 29, 2017, 12 pages.

* cited by examiner

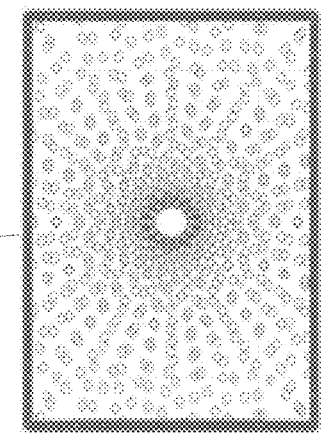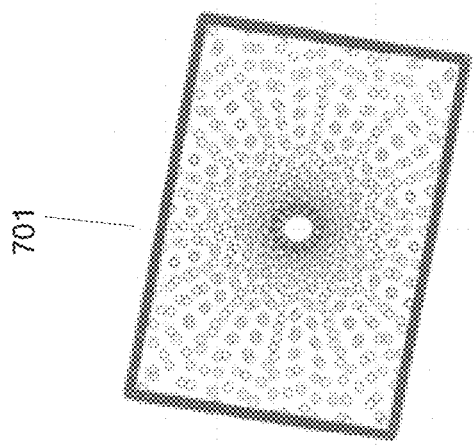
FIG. 7

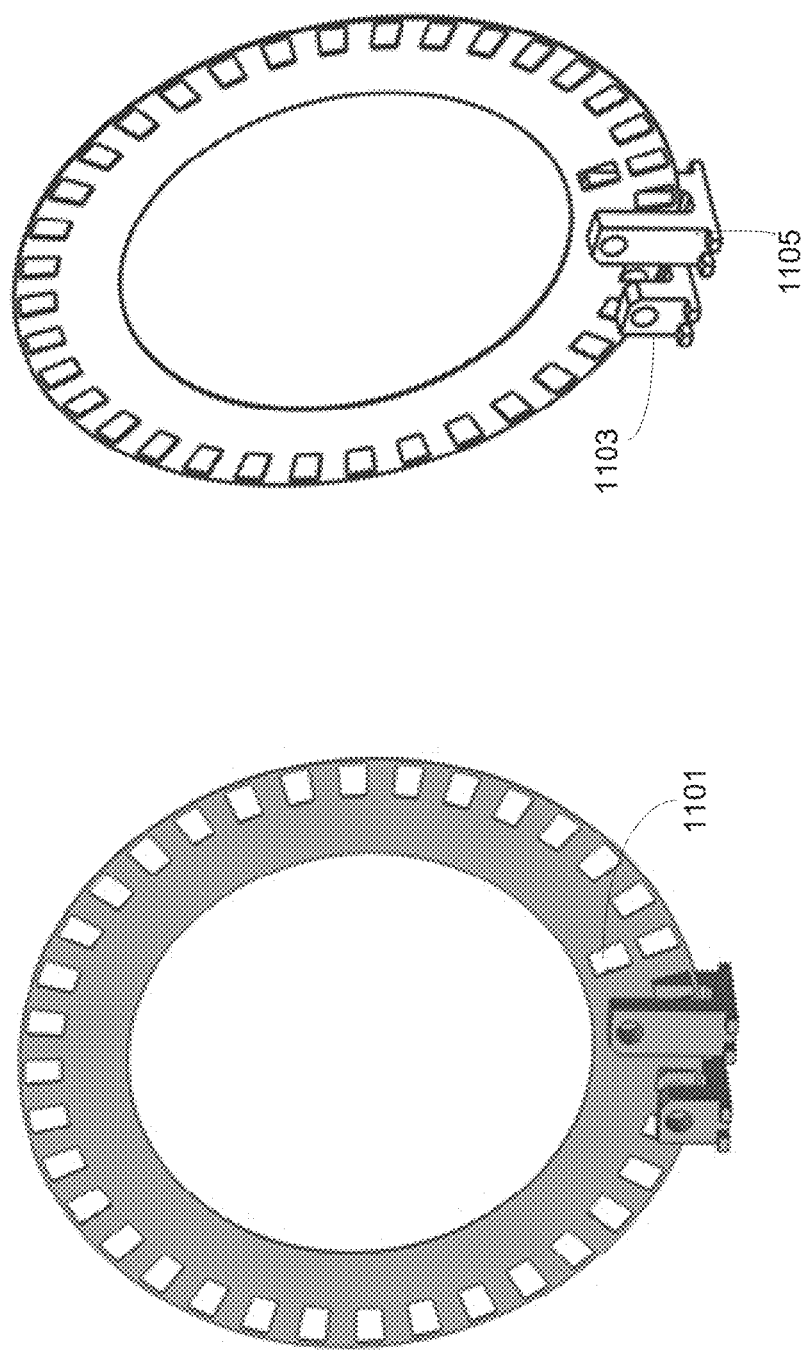

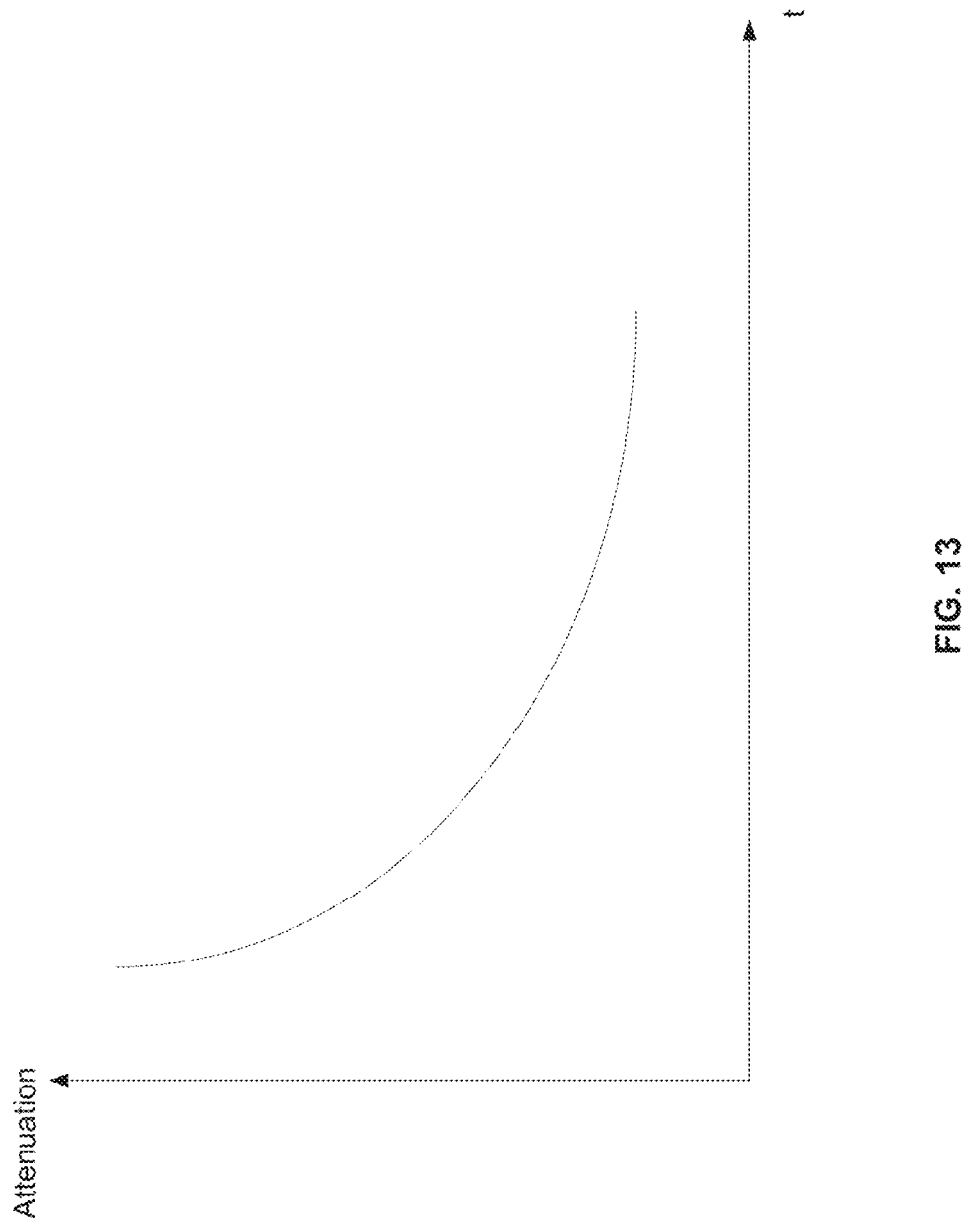

ANGLE CALIBRATION IN LIGHT DETECTION AND RANGING SYSTEM

CROSS REFERENCE TO RELATED APPLICATION

The present application is a continuation of International Patent Application No. PCT/CN2017/082603, filed Apr. 28, 2017, which is incorporated herein by reference.

TECHNICAL FIELD

This present disclosure is directed general to system calibration, and more specifically, to calibration of light detection and ranging (LIDAR) systems.

BACKGROUND

With their ever increasing performance and lowering cost, unmanned movable objects, such as unmanned vehicles, drones, and other robots, are now extensively used in many fields. Representative missions include real estate photography, inspection of buildings and other structures, fire and safety missions, border patrols, and product delivery, among others. Unlike traditional image sensors (e.g., cameras) that can only sense the surroundings in two dimensions, LIDAR can obtain three-dimensional information by detecting the depth. Due to the reliance on emitted and reflected light beams to ascertain the positions of the surroundings, there remains a need for improved techniques and systems to increase accuracy of LIDAR scanning modules.

SUMMARY OF PARTICULAR EMBODIMENTS

This patent document relates to techniques, systems, and devices for conducting calibration of LIDAR systems.

In one exemplary aspect, a light detection and ranging (LIDAR) device is disclosed. The device comprises a light beam emitter operable to emit a light beam; a prism set positioned in an optical path of the light beam to refract the light beam onto a surface of a surrounding object; a light detector to detect light reflected by the surface of the surrounding object; a controller, in communication with the light detector, configured to estimate the surface of the surrounding object based on the detected light. The prism set includes at least a first prism and a second prism. The controller is operable to (1) determine a relative bias in the prism set, the relative bias being a difference between a rotational deviation of the first prism and a rotational deviation of the second prism; and (2) cause, based on the relative bias in the prism set, a compensation for an estimation error in the controller's estimation of the surface of the surrounding object.

In another exemplary aspect, a calibration system for a light detection and ranging (LIDAR) device is disclosed. The system comprises a memory that stores instructions, and a processor in communication with the memory and operable to execute the instructions to implement a method of calibrating a first prism and a second prism of the LIDAR device. The method comprises: obtaining a plurality of points indicative of a surface shape of a surrounding object; evaluating a cost function that accounts for a change of the surface shape of the surrounding object using the plurality of points; determining a relative bias in the prism set using the cost function, wherein the relative bias is a difference between a rotational deviation of the first prism and a rotational deviation of the second prism; and causing, based on the relative bias, a compensation for an estimation error in an estimation of the surface shape of the surrounding object.

In yet another exemplary aspect, a light detection and ranging (LIDAR) device is disclosed. The device comprises a light beam emitter operable to emit a light beam; a prism set positioned in an optical path of the light beam to refract the light beam onto a surface of a surrounding object; a motor coupled to one or more prisms in the prism set, operable to rotate at a rotational speed to cause the one or more prisms in prism set to rotate; an encoding device coupled to the motor, operable to generate a pulse signal in response to angular movement of the motor during a plurality of time intervals; and a controller in communication with the encoding device, operable to (1) determine a rotational speed of the motor based on the pulse signal, (2) determine an angular position of the motor based on the rotational speed, and (3) determine, using the angular position of the motor, an angular position of the prism set to facilitate an estimation of the surface of the surrounding object.

In yet another exemplary aspect, a calibration system for a light detection and ranging (LIDAR) device is disclosed. The system comprises a memory that stores instructions, and a processor in communication with the memory and operable to execute the instructions to implement a method of calibrating a prism set of the LIDAR device, wherein the prism set directs an outgoing light beam onto a surface of a surrounding object, the method comprising: obtaining a pulse signal corresponding to an amount of angular movement of a motor during a plurality of time intervals, wherein the motor is coupled to one or more prisms the prism set to cause the prisms in prism set to rotate, determining a rotational speed of the motor based on the pulse signal and the amount of angular movement, determining an angular position of the motor based on the rotational speed, determining, using the angular position of the motor, an angular position of the prism set, and computing a direction of the outgoing light beam based on the angular position of the prism set.

In yet another exemplary aspect, a method of calibrating a light detection and ranging (LIDAR) device is disclosed. The method includes obtaining a plurality of points indicative of a surface shape of a surrounding object; evaluating a cost function that accounts for a change of the surface shape of the surrounding object using the plurality of points; determining a relative bias between the first prism and the second prism based on the normal vectors of the plurality of points, wherein the relative bias is a difference between a rotational deviation of the first prism and a rotational deviation of the second prism; and causing, based on the relative bias, a compensation for an estimation error in an estimation of the surface shape of the surrounding object.

In yet another exemplary aspect, a method of calibrating a light detection and ranging (LIDAR) device is disclosed. The method comprises obtaining a pulse signal corresponding to an angular movement of a motor during a plurality of time intervals, wherein the prism set directs an outgoing light beam onto a surface of a surrounding object and the motor is coupled to one or more prisms in the prism set to cause the one or more prisms in the prism set to rotate; determining a rotational speed of the motor based on the pulse signal and the amount of angular movement; determining an angular position of the motor based on the rotational speed; determining, using the angular position of the motor, an angular position of the prism set; and computing a direction of the outgoing light beam based on the angular position of the prism set.

The above and other aspects and their implementations are described in greater detail in the drawings, the description and the claims.

BRIEF DESCRIPTION OF THE DRAWINGS

FIG. 7 shows a comparison of an exemplary reconstructed point data model with $\Delta R=0$ and the ground truth model.

FIG. 11 show an exemplary configuration of the optical rotary encoder that can be used for the dynamic calibration of the motor.

FIG. 13 shows an exemplary analytical model of the attenuation of angular velocity based on historical statistics.

DETAILED DESCRIPTION

With the ever increasing use of unmanned movable objects, such as unmanned cars or aviation vehicles, it is important for them to be able to independently detect obstacles and to automatically engage in obstacle avoidance maneuvers. Light detection and ranging (LIDAR) is a reliable and stable alternative detection technology. Moreover, unlike traditional image sensors (e.g., cameras) that can only sense the surroundings in two dimensions, LIDAR can obtain three-dimensional information by detecting the depth. Because LIDAR systems rely on the emitted and reflected light beams to ascertain the positions of the surroundings, it is desirable to ensure that the components of the system are calibrated to achieve accurate estimation of the environment. This patent document describes techniques and methods for calibrating a LIDAR system that provide added accuracy in reconstruction of the surroundings using point cloud data.

In the following, numerous specific details are set forth to provide a thorough understanding of the presently disclosed technology. In some embodiments, well-known features are not described in detail to avoid unnecessarily obscuring the present disclosure. References in this description to "an embodiment," "one embodiment," or the like, mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. Also, it is to be understood that the various embodiments shown in the figures are merely illustrative representations and are not necessarily drawn to scale.

In this patent document, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

In the following description, the example of prism calibration in a LIDAR system is used, for illustrative purposes only, to explain various techniques that can be implemented. In other embodiments, the techniques introduced here are applicable to other suitable scanning modules, vehicles, or both. For example, even though one or more figures introduced in connection with the techniques illustrate calibration in a Risley prism pair, in other embodiments, the techniques are applicable in a similar manner to provide calibration for other type of optical components including, but not limited to, other types of prism or prism set, or a diffraction grating.

Overview

Figure 1:
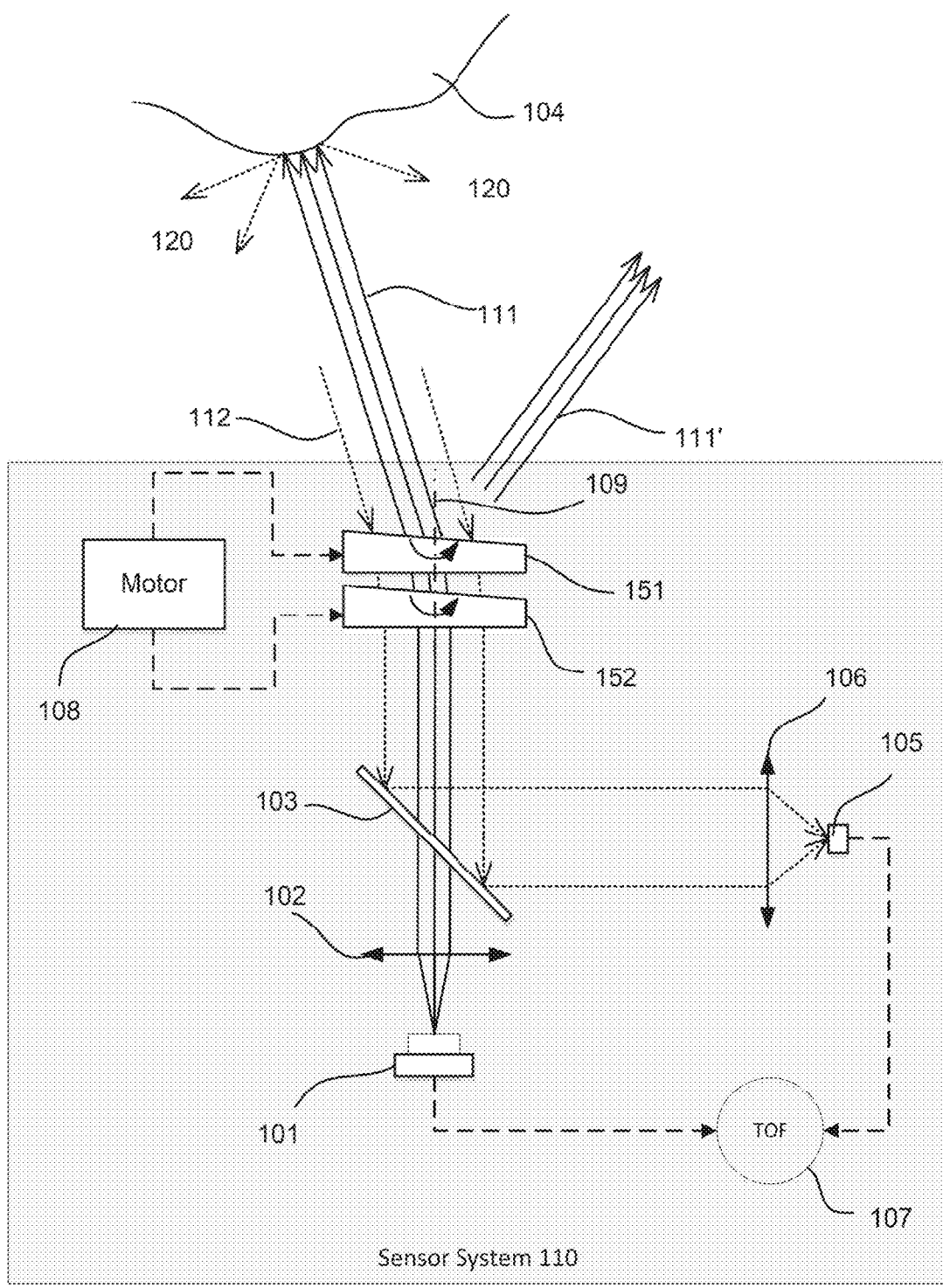
FIG. 1 shows a schematic diagram of an exemplary LIDAR sensor system in accordance with various embodiments of the present invention.

FIG. 1 shows a schematic diagram of an exemplary LIDAR sensor system in accordance with various embodiments of the present invention. For example, a sensor system 110 can be a LIDAR sensor system, which can detect the distance of the object 104 based on measuring the time for light to travel between the sensor system 110 and the object 104, i.e., the a time-of-flight (TOF).

The sensor system 110 includes a light emitter 101 that can generate a laser beam. For example, the laser beam can be a single laser pulse or a series of laser pulses. A lens 102 can be used for collimating the laser beam generated by the light emitter 101. The collimated light can be directed toward a beam splitting device 103. The beam splitting device 103 can allow the collimated light from the light source 101 to pass through. Alternatively, the beam splitting device 103 may not be necessary when different schemes are employed (e.g. when a light emitter is positioned in front of the detector).

In this particular embodiment shown in FIG. 1, the LIDAR sensor system 100 includes a Risley prism pair in the path of the outgoing light. The Risley prism pair may comprise two prisms 151-152, for light steering/scanning. For example, the two prisms 151-152 may be placed next to each other in a parallel fashion. In various embodiments, the prisms 151-152 may have a round cross section and the central axes for the prisms 151-152 may coincide with each other. In various embodiments, one or more motors (e.g., motor 108) can cause (e.g., through gears or other controlling/driving mechanisms) the prisms 151-152 to rotate about the common axis 109 (e.g., the central axis). For example, in some implementations, the system can include a single motor that is responsible for driving some or all of the prisms, e.g., through a set of gears or other suitable mechanisms. In other examples, the prisms can be individually driven by separate motors. The rotation frequency, geometry and orientation of the two prisms may be different, so that the relative angle between the two prisms can change with time. Thus, when the laser beam passes through the prism pair 151-152, the direction of the outgoing beam may change accordingly. Due to the difference in refraction index (i.e., the prisms can have a refractive index that is different from the air), refraction may occur at the various air-substrate interfaces as the beam pass through the prism.

The beam steering device can comprises various optical elements such as prisms, mirrors, gratings, optical phase array (e.g., liquid crystal controlled grating). These different optical elements can rotate about a common axis 109 in order to steer the light toward different directions, such as direction 111 and 111'.

When the outgoing beam 111 hits the object 104, the reflected or scattered light may spread over a large angle 120 and only a fraction of the energy may be reflected back toward the sensor system 110. The return beam 112 can be reflected by the beam splitting device 103 toward a receiving lens 106, which can collect and focus the returned beam on a detector 105.

The detector 105 receives the returned light and convert the light into electrical signals. Also, a measuring circuitry, such as a time-of-flight (TOF) unit 107, can be used for measuring the TOF in order for detecting the distance to the object 104. Thus, the sensor system 110 can measure the distance to the object 104 based on the time difference between the generating of the light pulse 111 by the light source 101 and the receiving of the return beam 112 by the detector 105.

Figure 2:
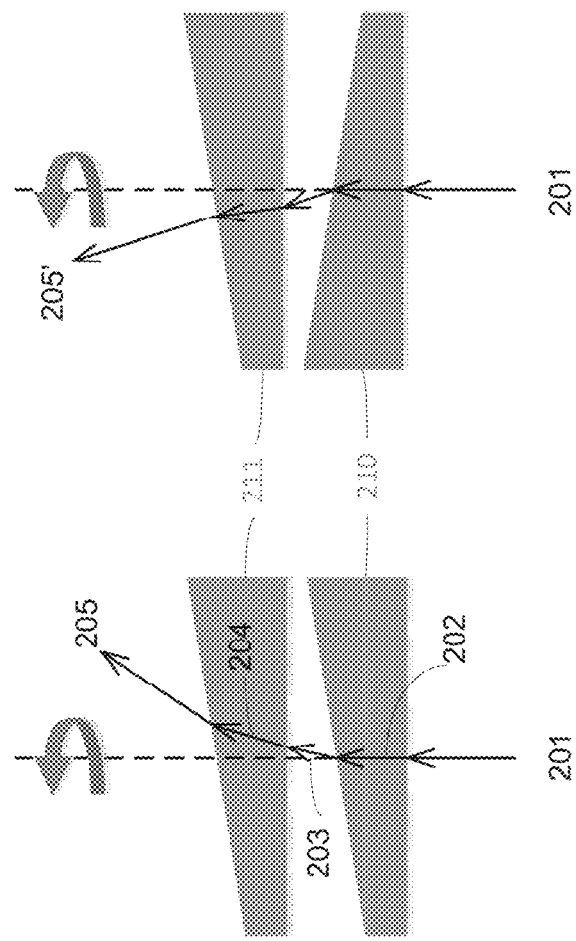
FIG. 2 shows a diagram of an exemplary refraction pattern using a prism pair.

In the example shown in FIG. 2, an incident beam 201 may be incident upon the first prism 210 at the first surface from the air at a vertical angle. Since the beam 201 is perpendicular to the first surface, no refraction may occur (i.e., the beam 202 transmitting in the first prism 210 is in the same direction as the incident beam 201). In other examples, refraction may occur at the first surface if the incident angle is non-vertical.

Furthermore, as the beam 202 exits from the first prism 210, refraction may occur at the second surface of the first prism 210 and forms beam 203. Furthermore, when the beam 203 incidents into the second prism 211, refraction occurs at the first surface of the second prism 211 and forms a refracted beam 204. Then, as the beam 204 passes through the second surface of the second prism 211, the outgoing beam 205 further deviates from the direction of original incident beam 201.

Figure 3:
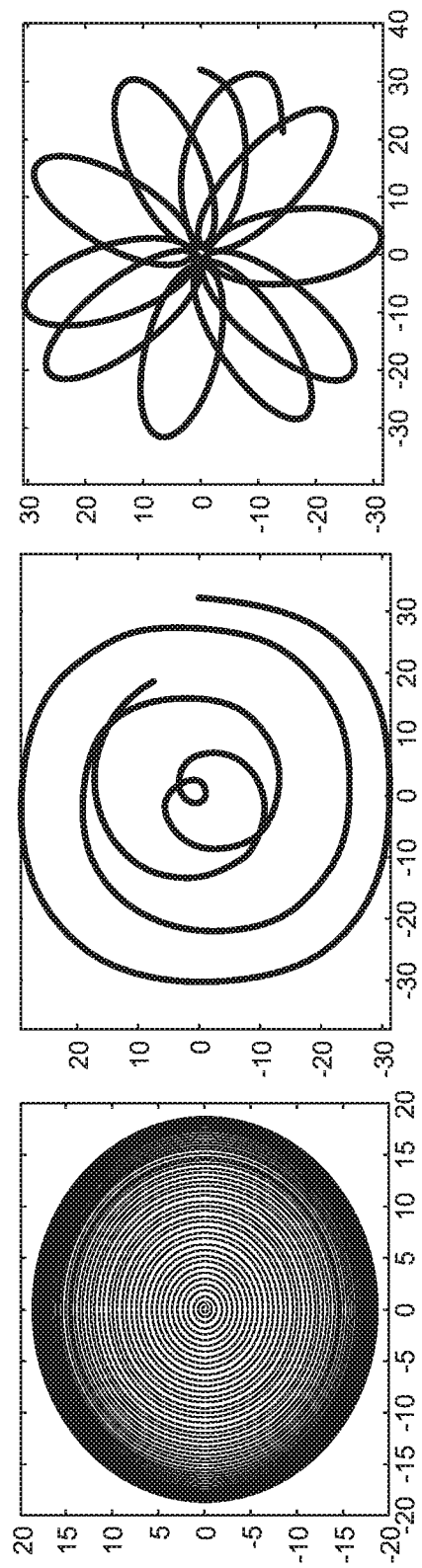
FIG. 3 shows some of the exemplary movements of the outgoing beam using a prism pair.

Further, as the prisms 210 and 211 rotate, the outgoing angle 205' changes accordingly. Different rotation speeds of prism 210 and 211 can cause different type of movements of the outgoing beam. FIG. 3 shows some of the exemplary movements of the outgoing beam using a prism pair.

In order to accurately measure the distance of the object 104 to the LIDAR sensor system 110, it is desirable to know the accurate orientation and rotation angles of the prisms. As discussed in more detail below, embodiments disclosed here are able to determine different biases in the prisms, and perform calibration by compensating for an estimation error in the controller's estimation of the surrounding objects. In some examples, the controller may be operable to determine a relative bias in the prism set and/or a collective bias in the prism set, and perform calibration based on one ore more of these biases. In some of these examples, the controller may be able to determine a rotational deviation of each prism in the prism set using these determined biases, and use the rotational deviations for the amount of calibration.

Calibration for Static Prism Attributes

Figure 4A:
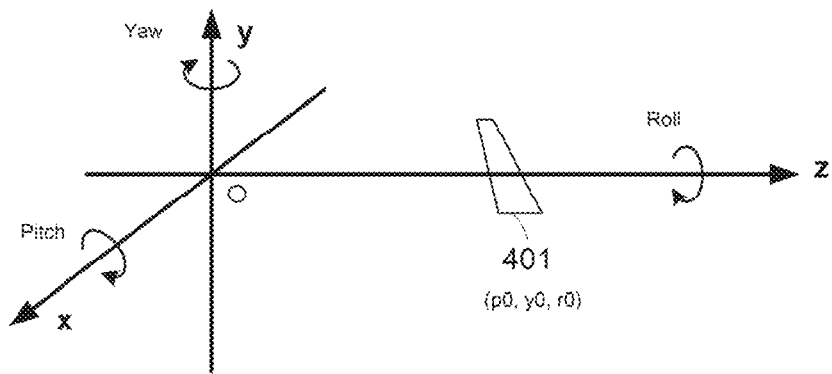
FIG. 4A shows orientations of an exemplary prism defined in pitch, yaw, and roll directions.
Figure 4B:
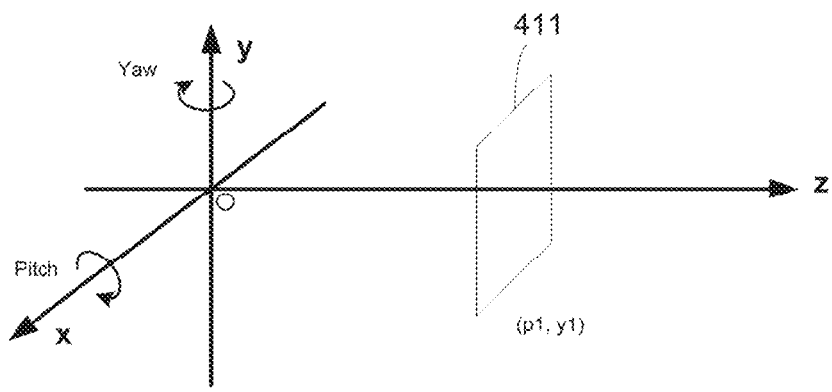
FIG. 4B shows orientations of an exemplary plane of rotation of a motor defined in pitch and yaw directions.

After a prism 401 is installed in the LIDAR system, its initial orientation can be defined as (p0, y0, r0) in pitch, yaw, and roll directions, such as shown in FIG. 4A. In some implementations, the prism 401 is also coupled to a motor (not shown for simplicity) that has a plane of rotation 411. FIG. 4B shows that the orientation of the plane of rotation 411 is further defined as (p1, y1) in pitch and yaw directions. Ideally, all these values—p0, y0, r0, p1, and r1—are zeros. However, imprecision in manufacturing processes can introduce deviations to the expected orientations of the prism as well as the orientations of the motor. If the deviations remain unadjusted, they can greatly affect the accuracy of TOF calculation and lead to wrong estimates of the surrounding objects. Therefore, it is desirable to calibrate the LIDAR system to account for these deviations. In particular, the deviation of a prim's orientation in the roll direction has a substantial impact on the sensing results. The present disclosed technology, therefore, focuses on the calibration of deviations in the roll direction of the prisms. However, note that the techniques disclosed here may be applied to mitigate deviations in other directions in a similar manner.

Figure 5:
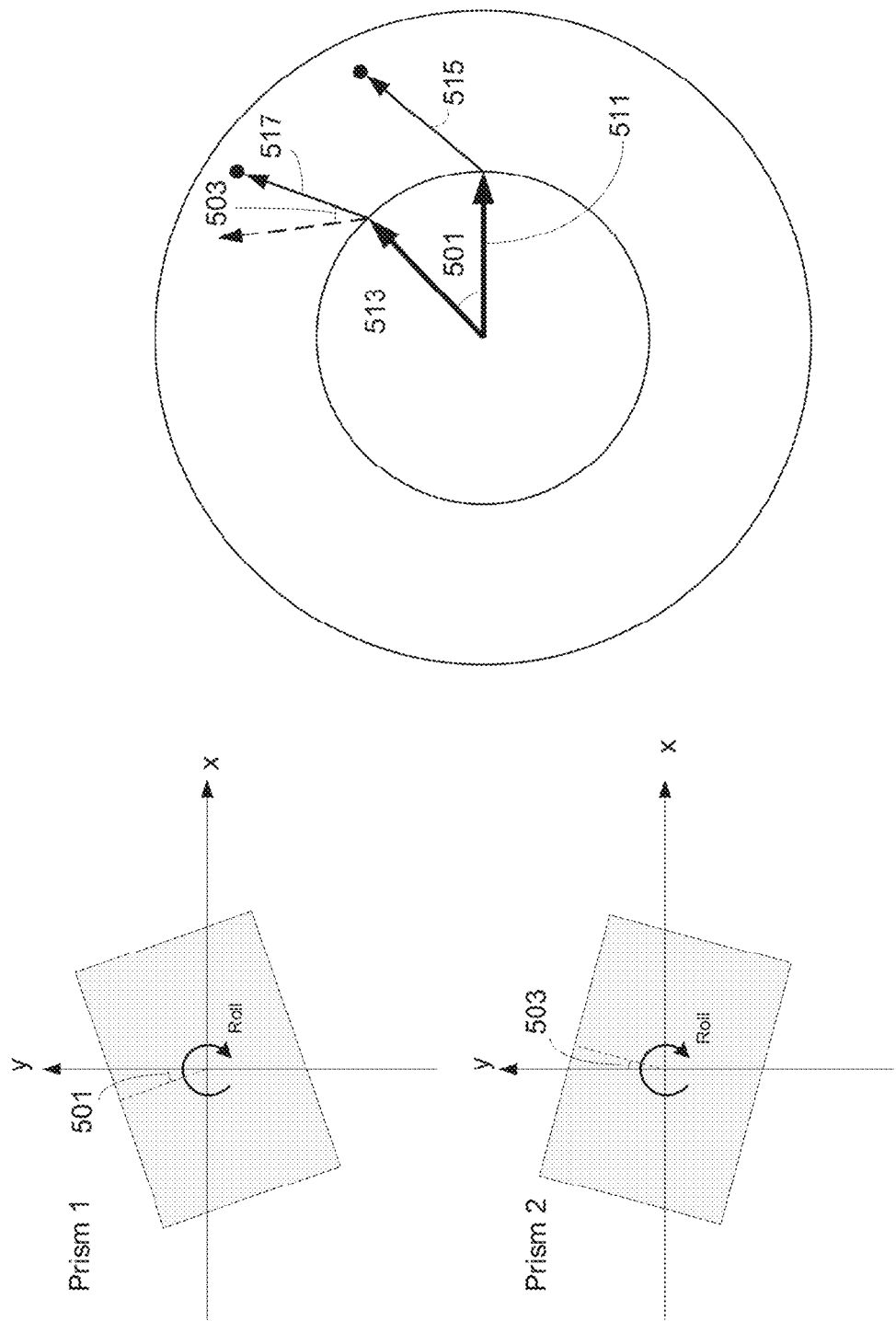
FIG. 5 is an exemplary schematic diagram to show how deviations in the roll direction of the prisms accumulate.

FIG. 5 is an exemplary schematic diagram to show how deviations in the roll direction of the prisms accumulate. The accumulated deviation can result in a large difference between the estimated positions of the surrounding objects and the actual positions of the surrounding objects. In this example, Prism 1 has a small deviation angle 501 in the roll direction, possibly caused by manufacturing imprecisions during the installation of Prism 1. Similarly, due to imprecision in manufacture processes, Prism 2 has a small deviation angle 503 in the roll direction. The deviation angles 501 and 503 can also be caused by other factors after the installation of the prism set, such as structural impact that the LIDAR system sustains during its use. Without knowledge of the deviation angle 501, direction 511 is the expected direction of outgoing beam from the first prism. The actual direction 513, however, deviates from the expected direction 511 due to the deviation angle 501. Similarly, direction 515 is the expected direction of the outgoing beam from the second prism. The actual direction 517 deviates from 515 due to the accumulated deviations of 501 and 503 in the roll direction.

Figure 6A:
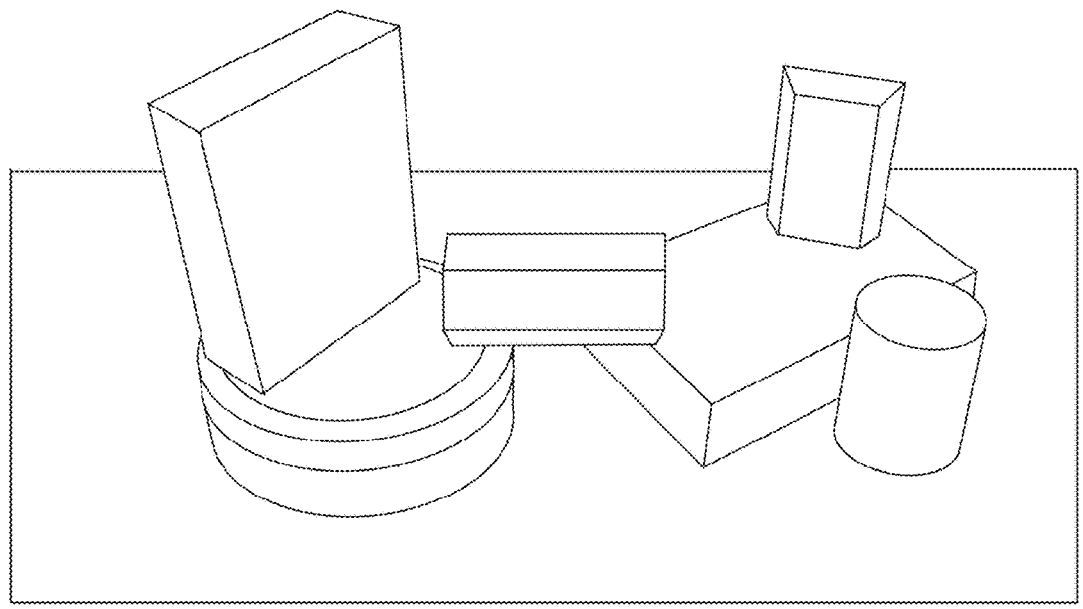
FIG. 6A shows an exemplary test scene that contains some boxes and containers of other shapes.
Figure 6B:
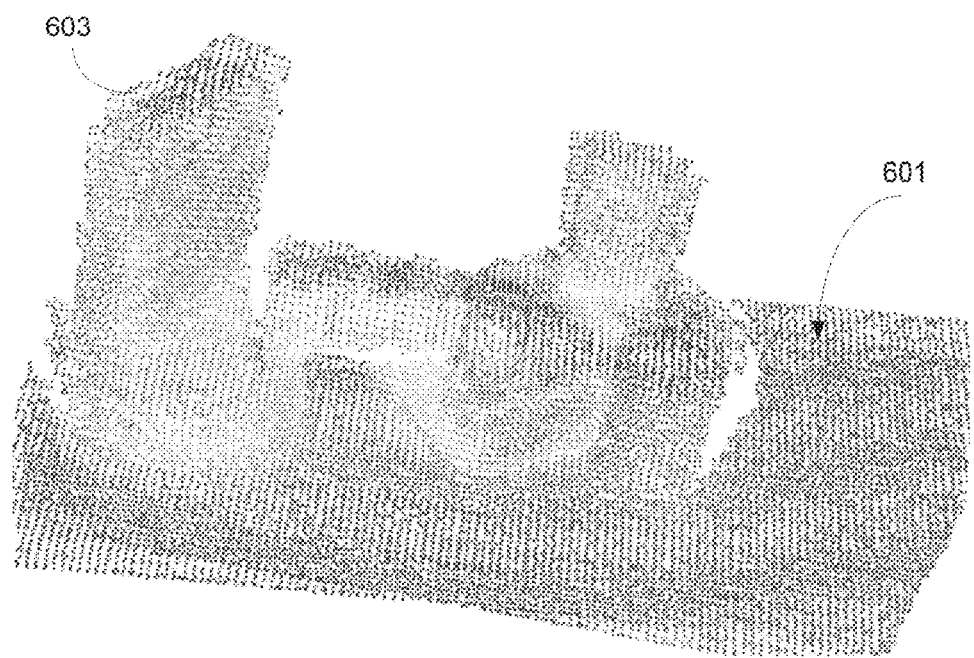
FIG. 6B shows an exemplary set of reconstructed point cloud data without prism calibration.

FIGS. 6A-6B illustrate exemplary errors introduced by prism deviations in a test scene. FIG. 6A shows an exemplary test scene that contains some boxes and containers of other shapes. FIG. 6B shows an exemplary set of reconstructed point cloud data without prism calibration. Due to the deviations in the orientations of the prisms (particularly, the roll direction), some of the reconstructed surfaces appear warped. For example, the ground surface 601 appears to be a curvy surface instead of a flat surface. Other surfaces, such as 603, also appear to have some physical distortions that may not accurately represent the objects in the test scene.

Experimentation has shown that, assuming the first prim has a deviation R0 in the roll direction, and the second prism has a deviation R1 in the roll direction, the surface distortion can be largely attributed to $\Delta R = R0-R1$. For example, as shown in FIG. 7, when $\Delta R=0$ (i.e., $R0=R1$), the reconstructed point data model of a box 701 does not show much of surface distortion. The model 701 only shows a rotational bias, which is caused by the deviation R0 of the first prism, as compared to the ground truth model 703. Therefore, it is desirable to evaluate ΔR first. Then, after obtaining the remaining bias R0, R1 can be known by computing R1=R0+ΔR. In some implementations, R0 and R1 can also be evaluated independently and in different orders. In other implementations, R0 and R1 can be viewed as a combined deviation of the prism set and evaluated together as a whole.

In various embodiments, the calibration process can take advantage of smooth or flat surfaces in the surrounding objects of the LIDAR sensor system. For example, the LIDAR sensor system can sense buildings and streets. The surfaces of the buildings, when being sensed from a distance, can be deemed as several flat surfaces. Similarly, other objects, such as chairs or curbs, may be deemed as having primary flat surfaces even though some of the surfaces may have curved subsections. The surface normal of a substantially flat surface remains approximately the same at different locations on the surface.

Figure 8:
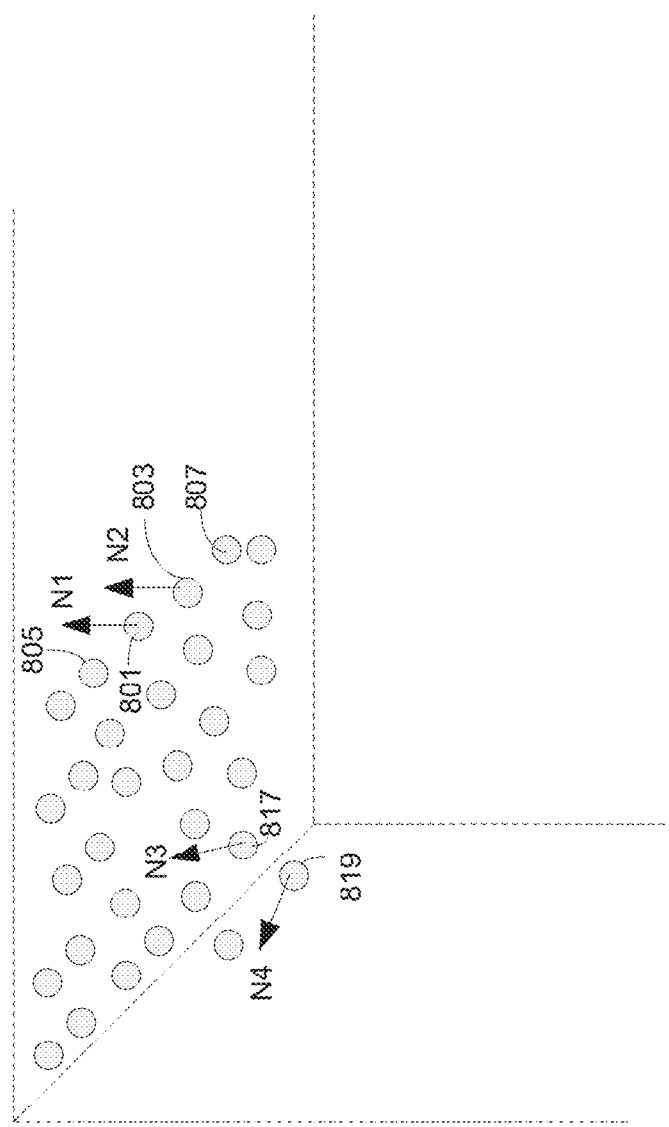
FIG. 8 shows a schematic diagram of exemplary points on a top surface of a box.

Therefore, if a group of points in a point cloud data set are deemed as surface points of the same object, it is reasonable to assume that the surface normal at each of the point is very close to the surface normal at its adjacent points. For example, FIG. 8 shows a schematic diagram of exemplary points on a top surface of a box. Point 801 has several adjacent points, including point 803 and point 805.

In some embodiments, the adjacent points can be adjacent to point 801 in the temporal domain (e.g., because each point is associated with a timestamp indicating when the reflected light signal is detected by the LIDAR sensing system). For example, point 803 is associated with a timestamp of $t_{i-1}$, point 801 is associated with a timestamp of $t_i$, and point 805 is associated a timestamp of $t_{i+1}$. Alternatively, the adjacent points can also be adjacent to point 801 in the spatial domain when their positions indicate that they are located close to each other.

In some embodiments, the spatially adjacent points and the temporal adjacent points can be the same set of points. In some embodiments, they can be two sets of substantially overlapping, but not identical points. In the particular example shown in FIG. 8, a normal vector N1 can be calculated for point 801 based on the positions of its adjacent points, e.g., point 803 and point 805. Similarly, a normal vector N2 can be calculated for point 803 based on the position of its adjacent points, e.g., point 801 and point 807. Because both point 801 and 803 are located on a top surface of the box, N1 and N2 are substantially the same and an angle $\theta_1$ between N1 and N2 is close to zero.

If a point is located close to a surface boundary, the calculated normal vector may not accurately reflect the real surface normal of the object. For example, point 817 is located at the boundary of the top surface and one of the side surfaces of the box. Its normal vector N3 is affected by the location of one of its adjacent point 819. Similarly, the normal vector N4 of point 817 is also affected and thus inaccurate. The angle $\theta_2$ between N3 and N4 is substantially larger than angle values between other normal vectors. In some implementations, a boundary condition $T(\theta)$ can be used to exclude a boundary point from consideration if the angle between its normal and an adjacent normal exceeds a predetermined threshold.

In some embodiments, the problem of finding ΔR can be viewed as solving an optimization problem that minimizes $\theta_i$ given a point cloud data set of N points:

$$F = \mathrm{argmin}\, \Sigma_{i=0}^{N-1} [\|\theta_i\| \cdot T(\theta_i)] \qquad \mathrm{Eq.}\ (1)$$

Figure 9A:
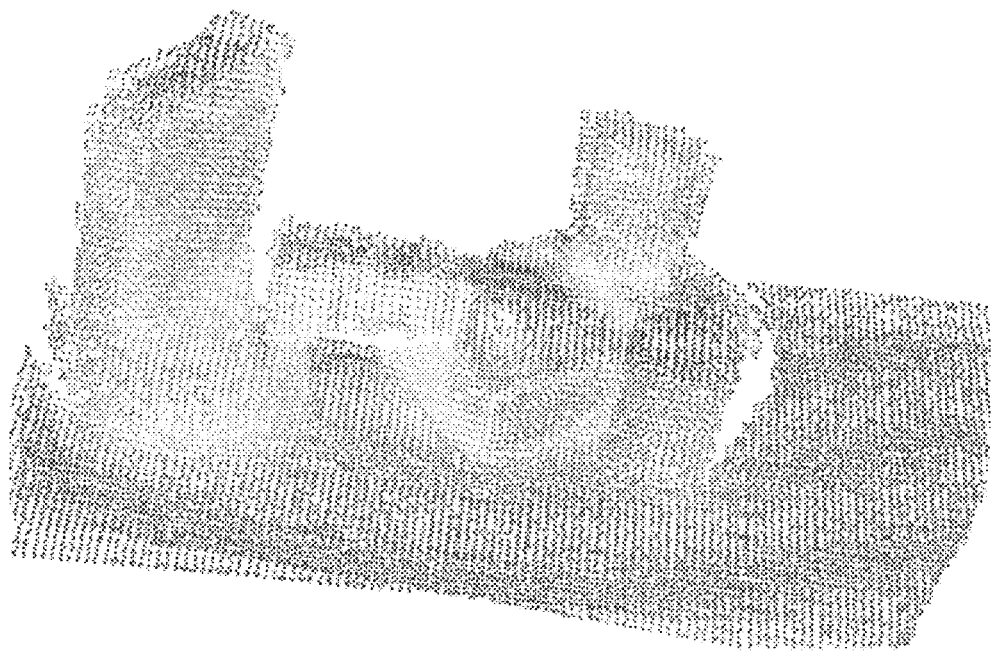
FIG. 9A shows the exemplary set of reconstructed point cloud data without prism calibration.
Figure 9B:
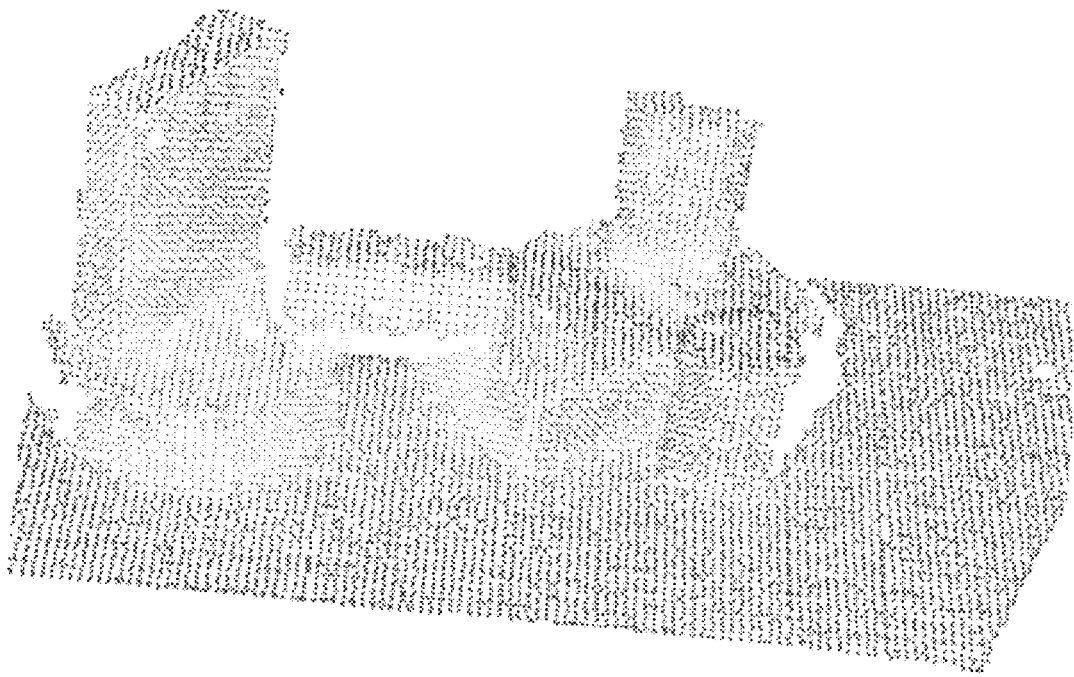
FIG. 9B shows an exemplary set of reconstructed point cloud data after calibration of $\Delta R$.

FIG. 9A shows the exemplary set of reconstructed point cloud data without prism calibration (same as FIG. 6B). FIG. 9B shows an exemplary set of reconstructed point cloud data after calibration of the relative bias, ΔR. It is apparent that, after the calibration of ΔR, the surface distortion is greatly reduced.

Figure 9C:
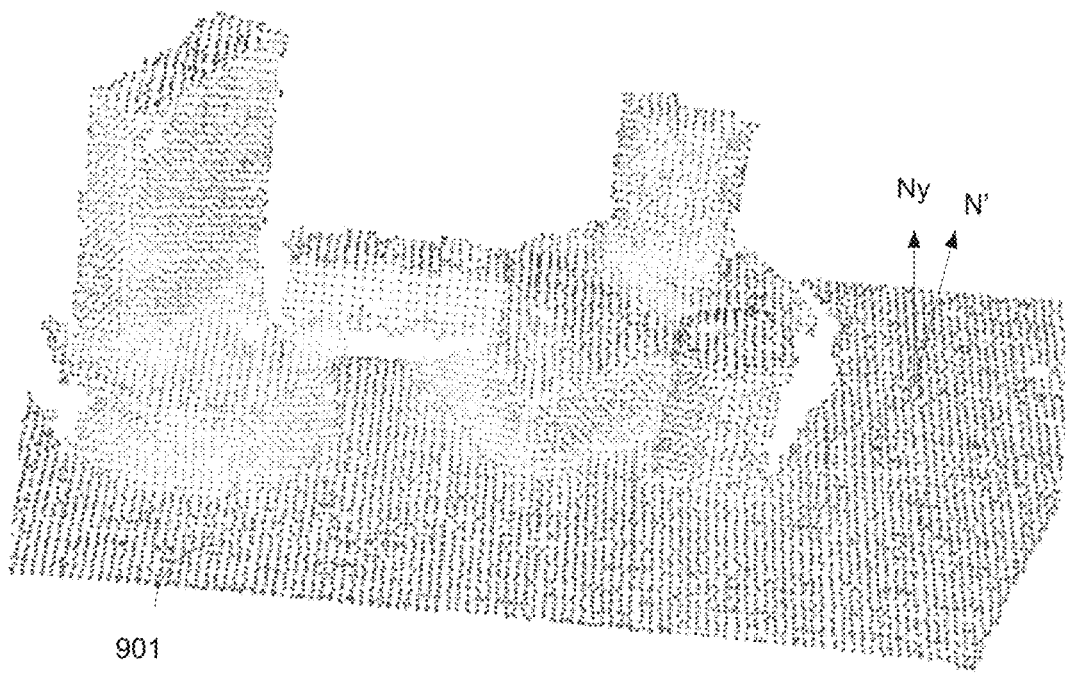
FIG. 9C shows that an exemplary detection of a ground plane.
Figure 9D:
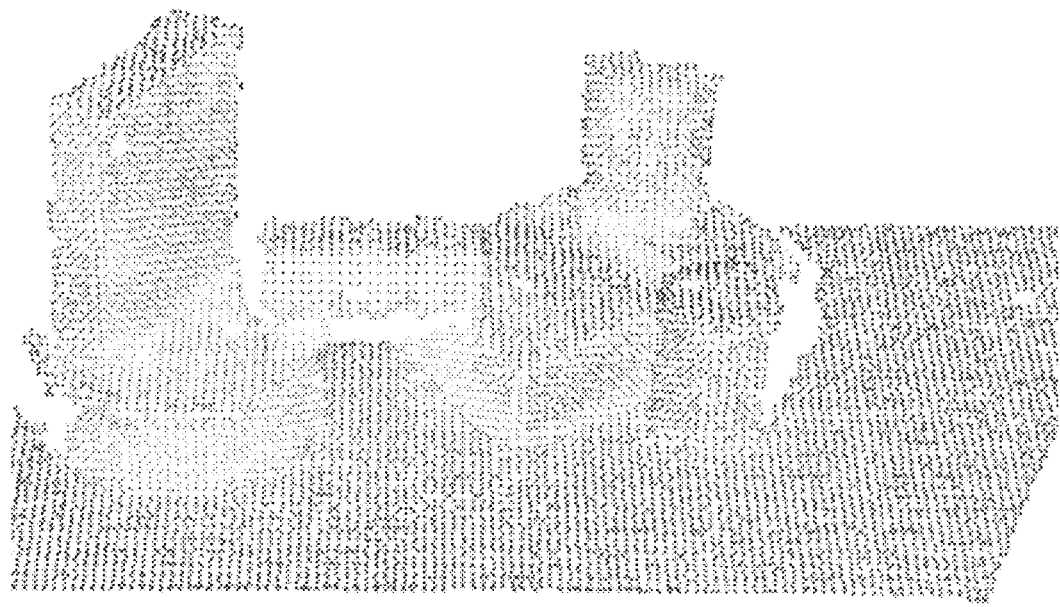
FIG. 9D shows an exemplary set of reconstructed point cloud data after calibration of R0 and R1.

In various embodiments, the surrounding objects of the LIDAR sensor system includes a ground plane (e.g., a street, a road, or a floor) as a reference object. The ground place can be assumed to have a normal vector that aligns with the y-axis as shown in FIG. 4A: $N_y = (0, 1, 0)$. Therefore, after knowing ΔR, the deviation R0 of the first prism can be obtained by first detecting a reference plane (e.g., a ground plane or another suitable reference object) in the point cloud data set and then calculating a difference between the normal vector of the ground plane and $N_y$. For example, as shown in FIG. 9C, a ground plane 901 can be detected using algorithms such as a random sample consensus (RANSAC) algorithm. The normal of the ground plane 901 is calculated to be N', while the ground truth normal is supposed to be $N_y$. The φ between N' and $N_y$ indicates the deviation R0 of the first prism. Then, deviation R1 can be subsequently obtained by calculating R0+ΔR. FIG. 9D shows an exemplary set of reconstructed point cloud data after calibration of R0 and R1. In some implementations, the reference object can also be objects other than the ground plane. For example, in a pre-determined test scene, a reference object can be a pre-identified object with a known surface normal.

Calibration for Dynamic Prism Attributes

Besides the static deviations of the prisms in various directions, the LIDAR sensor system also needs accurate dynamic angular positions of the prisms to compute the estimated location of surrounding objects. In some embodiments, the prism set is coupled to a motor having different gears so that the motor can drive different angular movement in different prisms in the prism set. The prism set can also be coupled to multiple motors to allow different angular movement of different prisms in the prism set. Therefore, calibration of the motor position enables an accurate reading of the angular positions of the prisms.

Figure 10A:
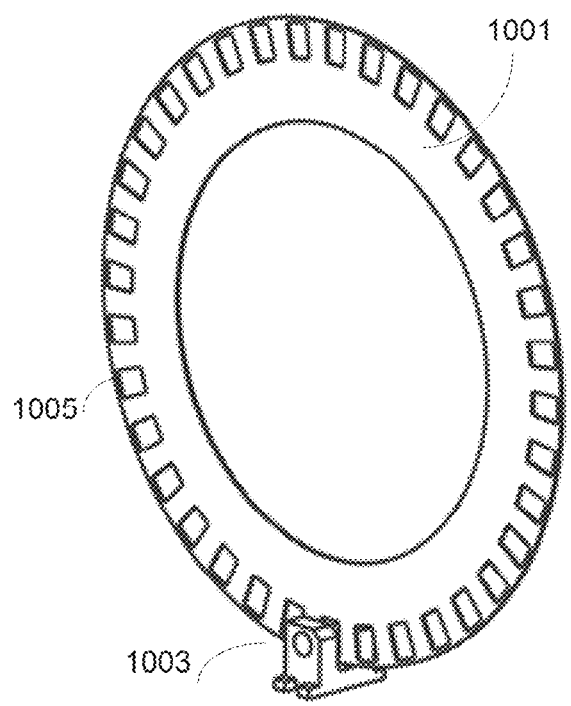
FIG. 10A shows an exemplary encoding device that can be used to calibrate the positon of the motor.
Figure 10B:
FIG. 10B shows an exemplary pulse signal produced by an optical switch.

Various types of encoding device can be used to calibrate the position of the motor. For example, the encoding device can be a conductive rotary encoder that makes use of the Hull effect. Alternatively, the encoding device can be an optical rotary encoder. FIGS. 10A-10B show an exemplary system can be used to dynamically calibrate the position of the motor. The particular example shown in FIG. 10A is an optical rotary encoder 1001 coupled to an optical switch 1003. A set of holes 1005 are distributed along the perimeter of the encoder 1001. The optical switch 1003 is positioned close to the holes 1005 so that it can produce a pulse signal in response to the angular movement of the optical rotary.

FIG. 10B shows an exemplary pulse signal produced by an optical switch 1003. Each time the pulse signal changes to a high level, such as at $T_0$ or $T_1$, it triggers a dynamic calibration of the motor. The dynamic calibration method is based on an assumption of a strong rotational inertia of the motor as prior knowledge. Because the time constant of the motor's rotational movement is large, it can be assumed that, absence any change of the driving force, the angular velocity W of the motor is constant for a short period of time. The angular position of the motor at time t thus can be defined as:

$$A(t) = A_0 + (t - T_0) * W \qquad \mathrm{Eq.}\ (2)$$

Therefore, the calibration at each trigger point indicated by the pulse signal, such as $T_0$, allows an accurate reading of the motor position A(t) at time t.

Figure 12:
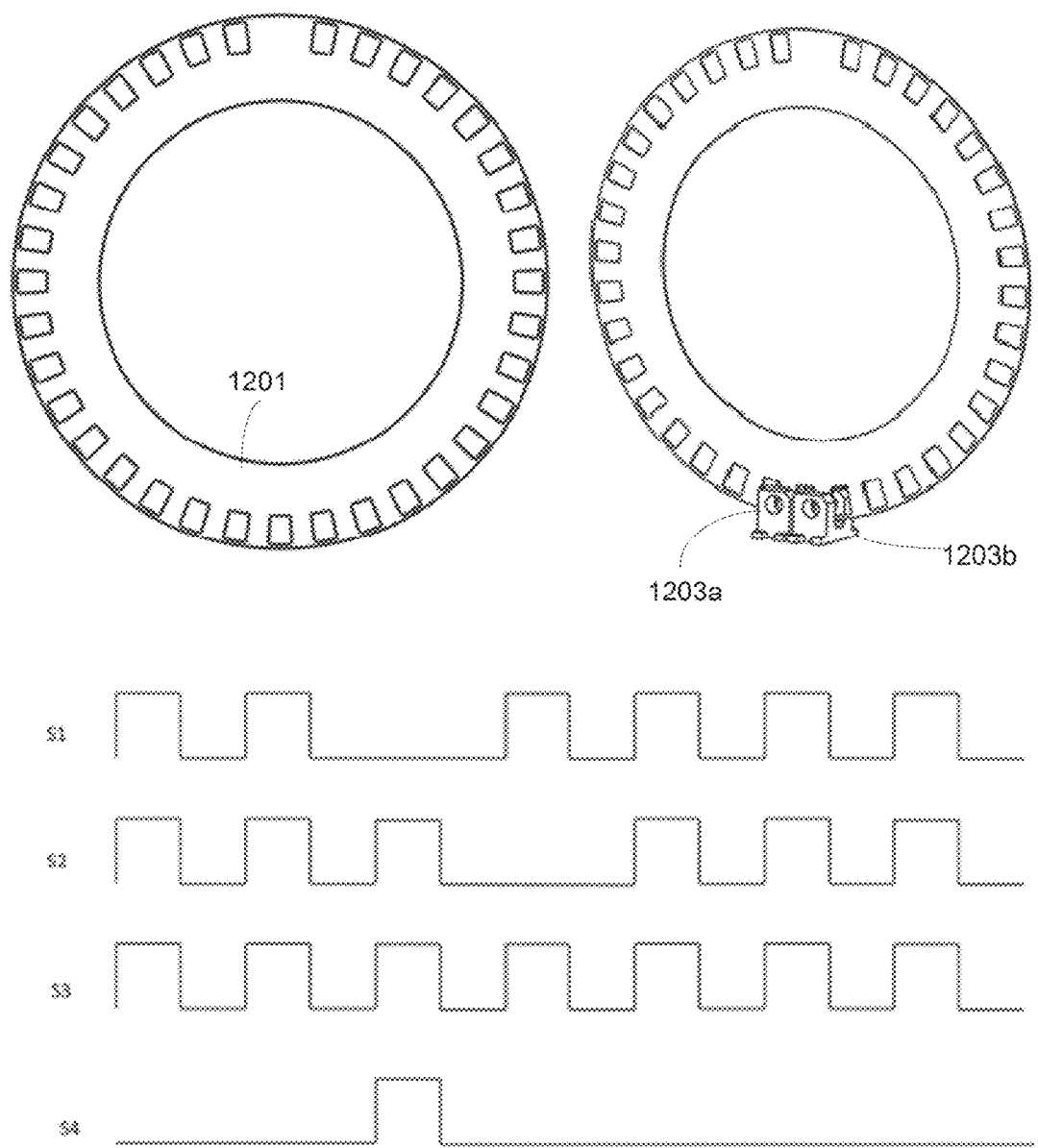
FIG. 12 show another exemplary configuration of the optical rotary encoder that can be used for the dynamic calibration of the motor.

FIGS. 11-12 show some exemplary configurations of the optical rotary encoder that can be used for the dynamic calibration of the motor. For example, as shown in FIG. 11, the optical rotary encoder can include an additional hole 1101 to ascertain an absolute zero position of the encoder. Accordingly, two optical sensors 1103 and 1105 are coupled to the optical rotary encoder. The smaller optical sensor 1103 produces the same type of pulse signal as the sensor 1003 shown in FIG. 10, while the larger optical sensor 1105 produces a signal that indicates the absolute zero position of the encoder.

Alternatively, as shown in FIG. 12, the optical rotary encoder 1201 can include a single missing hole along its perimeter. The missing hole can facilitate the detection of the absolute zero position of the encoder 1201. For example, two identical optical sensors 1203a and 1203b can be positioned close to the holes to produce pulse signals S1 and S2. A pulse signal S3 equivalent to the one shown in FIG. 10B can be obtained by applying a logic OR operation to S1 and S2. The pulse signal S4 indicating the absolute zero position of the encoder can be obtained by applying a logic XOR operation to S1 and S2.

Similarly, replying upon the rotational inertia of the motor, the angular velocity W can be predicted based on velocity values in previous N time intervals. The prediction can be made using various methods. Some of the exemplary methods include:

1. Computing an average velocity based on the velocity values in previous n time intervals. For example, the predicted velocity at time t (Wt) can be defined as:

$$Wt = \Sigma_1^N \text{AngleDiff}(i) / \Sigma_i^N \text{TimeDiff}(i). \quad \text{Eq. (3)}$$

AngleDiff(i) is the difference in angular position of the motor in time interval I, and TimeDiff(i) is the difference in time in time interval i.

2. Computing a weighted velocity based on the velocity values in previous n time intervals. For example, the predicted velocity Wt can be defined as:

$$Wp = \Sigma_1^N w(i) * \text{AngleDiff}(i) / \text{TimeDiff}(i) \quad \text{Eq. (4)}$$

Here, w(i) is the weight in each time interval i, and $\Sigma_1^N w(i) = 1$.

In some embodiments, the weights are inversely proportional to time. For example, w(j) is given a bigger value than w(i) if j>i (that is, time interval j is closer to the predicted time than time interval i) because the velocity closer to time t is a better indication of the velocity at time t.

3. Computing a predicted velocity based on a predetermined model of the angular velocity W. For example, FIG. 13 shows an exemplary analytical model of the attenuation of angular velocity W based on historical statistics of W values. Using this model, a predicted angular velocity Wt can be computed given a specific time t.

It is thus evident that, in one aspect of the disclosed technology, a light detection and ranging (LIDAR) device is disclosed. The device includes a light beam emitter operable to emit a light beam a prism set positioned in an optical path of the light beam to refract the light beam onto a surface of a surrounding object, a light detector to detect light reflected by the surface of the surrounding object, and a controller, in communication with the light detector, configured to estimate the surface of the surrounding object based on the detected light. The prism set including at least a first prism and a second prism. The controller is operable to (1) determine a relative bias in the prism set, the relative bias being a difference between a rotational deviation of the first prism and a rotational deviation of the second prism; and (2) cause, based on the relative bias in the prism set, a compensation for an estimation error in the controller's estimation of the surface of the surrounding object.

In some embodiments, in determining the relative bias, the controller is operable to perform an evaluation of a cost function that accounts for a change of a property the surface of the surrounding object. The determining of the relative bias can also include minimizing the cost function. In some embodiments, the evaluation of the cost function includes, for each point of the plurality of the measured points, (1) determining a normal vector of the point, the point representing a dot on the surface of the surrounding object as measured by the controller using the detected light; and (2) comparing the normal vector of the point with a normal vector of an adjacent point to the point. The adjacent point can be temporally adjacent to the point. The adjacent point can also be spatially adjacent to the point. In some implementations, the controller is operable to exclude the point in response to a determination that the angle between the normal vector of the point and the normal vector of the adjacent point exceeds a predetermined threshold.

In some embodiments, the controller is further operable to determine a collective bias in the prism set, the collective bias being a rotational deviation of the prism set. The collective bias can be determined based on an evaluation of an estimated normal vector of a reference object. The controller is operable to perform a random sample consensus (RANSAC) function on a plurality of measured points to identify the reference object. In some embodiments, the controller, in causing the compensation for the estimation error, is operable to determine the rotational deviation of the first prism and the rotational deviation of the second prism based on the relative bias and the collective bias.

In some embodiments, the device also includes a motor coupled to one or more prisms in the prism set, operable to rotate at a rotational speed and cause said one or more prisms in the prism set to rotate; and an encoding device coupled to the motor, operable to generate a pulse signal in response to an amount of angular movement of the motor during a plurality of time intervals. The controller is operable to (1) determine a rotational speed of the motor based on the pulse signal, (2) determine an angular position of the motor based on the rotational speed, and (3) determine, using the angular position of the motor, an angular position of the prism set to facilitate the estimation of the surface of the surrounding object.

The encoding device can be a conductive rotary encoder. The encoding device can also be an optical rotary encoder. The optical rotary encoder, in some implementations, can include a circular plate including a plurality of holes distributed along a perimeter of the circular plate with a single hole missing, and two identical optical sensors positioned side by side at a periphery location of the circular plate. The controller may be operable to determine the rotational speed of the motor by evaluating an average amount of angular movement of the motor during the plurality of time intervals. The controller may be operable to determine the rotational speed of the motor by evaluating a weighted amount of angular movement of the motor, wherein an angular movement in each of the plurality of time intervals is given a different weight that is inversely proportional to time. The controller may also be operable to determine the rotational speed of the motor using a predetermined analytical model of the rotational speed of the motor.

In another aspect of the disclosed technology, a calibration system for a light detection and ranging (LIDAR) device is disclosed. The system includes a memory that stores instructions, and a processor in communication with the memory and operable to execute the instructions to implement a method of calibrating a prism set of the LIDAR device including at least a first prism and a second prism. The method includes obtaining a plurality of points indicative of a surface shape of a surrounding object; evaluating a cost function that accounts for a change of the surface shape of the surrounding object using the plurality of points; determining a relative bias in the prism set using the cost function, wherein the relative bias is a difference between a rotational deviation of the first prism and a rotational deviation of the second prism; and causing, based on the relative bias, a compensation for an estimation error in an estimation of the surface shape of the surrounding object.

In some embodiments, the determining of the relative bias includes minimizing the cost function. The evaluation of the cost function includes, for each point of the plurality of points: determining a normal vector of the point, the point representing a dot on the surface of the surrounding object as measured by the controller using the detected light; and comparing the normal vector of the point with a normal vector of an adjacent point to the point. The adjacent point can be temporally adjacent to the point. The adjacent point can also be specially adjacent to the point. The evaluation of the cost function may also include excluding the point in response to a determination that the angle between the normal vector of the point and the normal vector of the adjacent point exceeds a predetermined threshold.

In some embodiments, the system also includes determining a collective bias in the prism set, the collective bias being a rotational deviation of the prism set. The determining of the collective bias includes identifying a reference object in the plurality of points.

In another aspect of the disclosed technology, a light detection and ranging (LIDAR) device is disclosed. The device includes a light beam emitter operable to emit a light beam; a prism set positioned in an optical path of the light beam to refract the light beam onto a surface of a surrounding object; a motor coupled to one or more prisms in the prism set, operable to rotate at a rotational speed and cause said one or more prisms in the prism set to rotate; an encoding device coupled to the motor, operable to generate a pulse signal in response to angular movement of the motor during a plurality of time intervals; and a controller in communication with the encoding device, operable to (1) determine a rotational speed of the motor based on the pulse signal, (2) determine an angular position of the motor based on the rotational speed, and (3) determine, using the angular position of the motor, an angular position of the prism set to facilitate an estimation of the surface of the surrounding object.

The encoding device can be a conductive rotary encoder. The encoding device can also be an optical rotary encoder. The optical rotary encoder, in some implementations, includes a circular plate including a plurality of holes distributed along a perimeter of the circular plate with a single hole missing, and two identical optical sensors positioned side by side at a periphery location of the circular plate.

In some embodiments, the controller determines the rotational speed of the motor by evaluating an average amount of angular movement of the motor during the plurality of time intervals. The controller may determine the rotational speed of the motor by evaluating a weighted amount of angular movement of the motor, wherein an angular movement in each of the plurality of time intervals is given a different weight that is inversely proportional to time. The controller may also determine the rotational speed of the motor using a predetermined analytical model of the rotational speed of the motor.

In another aspect of the disclosed technology, a calibration system for a light detection and ranging (LIDAR) device is disclosed. The system includes a memory that stores instructions, and a processor in communication with the memory and operable to execute the instructions to implement a method of calibrating a prism set of the LIDAR device, wherein the prism set directs an outgoing light beam onto a surface of a surrounding object. The method includes obtaining a pulse signal corresponding to an amount of angular movement of a motor during a plurality of time intervals, wherein the motor is coupled to one or more prisms in the prism set to cause the one or more prisms in the prism set to rotate, determining a rotational speed of the motor based on the pulse signal and the amount of angular movement, determining an angular position of the motor based on the rotational speed, determining, using the angular position of the motor, an angular position of the prism set, and computing a direction of the outgoing light beam based on the angular position of the prism set.

In some embodiments, the determining of the rotational speed of the motor includes evaluating an average amount of angular movement of the motor during the plurality of time intervals. The determining of the rotational speed of the motor may include evaluating a weighted amount of angular movement of the motor, wherein an angular movement in each of the plurality of time intervals is given a different weight that is inversely proportional to time. The determining of the rotational speed of the motor may also include using a predetermined analytical model of the rotational speed of the motor.

In another aspect of the disclosed technology, a method of calibrating a light detection and ranging (LIDAR) device is disclosed. The method includes obtaining a plurality of points indicative of a surface shape of a surrounding object; evaluating a cost function that accounts for a change of the surface shape of the surrounding object using the plurality of points; determining a relative bias between the first prism and the second prism based on the normal vectors of the plurality of points, wherein the relative bias is a difference between a rotational deviation of the first prism and a rotational deviation of the second prism; and causing, based on the relative bias, a compensation for an estimation error in an estimation of the surface shape of the surrounding object.

In some embodiments, the determining of the relative bias includes minimizing the cost function. The evaluation of the cost function includes, for each point of the plurality of the measured points determining a normal vector of the point, the point representing a dot on the surface of the surrounding object as measured by the controller using the detected light; and comparing the normal vector of the point with a normal vector of an adjacent point to the point. The adjacent point can be temporally adjacent to the point. The adjacent point can also be spatially adjacent to the point.

In some embodiments, causing the compensation for the estimation error includes determining a collective bias in the prism set, the collective bias being a rotational deviation of the prism set. The determining includes performing a random sample consensus (RANSAC) function on the plurality of points to identify a reference object.

In another aspect of the disclosed technology, a method of calibrating a light detection and ranging (LIDAR) device. The method includes obtaining a pulse signal corresponding to an angular movement of a motor during a plurality of time intervals, wherein the prism set directs an outgoing light beam onto a surface of a surrounding object and the motor is coupled to one or more prisms in the prism set to cause the one or more prisms in the prism set to rotate; determining a rotational speed of the motor based on the pulse signal and the angular movement; determining an angular position of the motor based on the rotational speed; determining, using the angular position of the motor, an angular position of the prism set; and computing a direction of the outgoing light beam based on the angular position of the prism set.

In some embodiments, the determining of the rotational speed of the motor includes evaluating an average amount of angular movement of the motor during the plurality of time intervals. The determining of the rotational speed of the motor may include evaluating a weighted amount of angular movement of the motor, wherein an angular movement in each of the plurality of time intervals is given a different weight that is inversely proportional to time. The determining of the rotational speed of the motor may also include using a predetermined analytical model of the rotational speed of the motor.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A light detection and ranging (LIDAR) device, comprising:
   a light beam emitter operable to emit a light beam;
   a prism set positioned in an optical path of the light beam to refract the light beam onto a surface of a surrounding object, the prism set including at least a first prism and a second prism;
   a light detector to detect light reflected by the surface of the surrounding object; and
   a controller, in communication with the light detector, configured to obtain a plurality of points indicative of a surface shape of the surrounding object based on the detected light,
   wherein the controller is operable to (1) evaluate a cost function that accounts for a change of the surface shape of the surrounding object, (2) determine a relative bias in the prism set, the relative bias being a difference between a rotational deviation of the first prism and a rotational deviation of the second prism; and (3) cause, based on the relative bias in the prism set, a compensation for an estimation error in the controller's estimation of the surface of the surrounding object.

2. The device of claim 1, wherein the determining of the relative bias includes minimizing the cost function.

3. The device of claim 1, wherein the evaluation of the cost function includes, for each point of the plurality of points, (1) determining a normal vector of the point, the point representing a dot on the surface of the surrounding object as measured by the controller using the detected light; and (2) comparing the normal vector of the point with a normal vector of an adjacent point to the point.

4. The device of claim 3, wherein the adjacent point is temporally adjacent to the point.

5. The device of claim 3, wherein the adjacent point is spatially adjacent to the point.

6. The device of claim 3, wherein the controller is operable to exclude the point in response to a determination that an angle between the normal vector of the point and the normal vector of the adjacent point exceeds a predetermined threshold.

7. The device of claim 1, wherein the controller is further operable to determine a collective bias in the prism set, the collective bias being a rotational deviation of the prism set.

8. The device of claim 7, wherein the collective bias is determined based on an evaluation of an estimated normal vector of a reference object.

9. The device of claim 8, wherein the controller is operable to perform a random sample consensus (RANSAC) function on the plurality of points to identify the reference object.

10. The device of claim 7, wherein the controller, in causing the compensation for the estimation error, is operable to determine the rotational deviation of the first prism and the rotational deviation of the second prism based on the relative bias and the collective bias.

11. A calibration system for a light detection and ranging (LIDAR) device, comprising:
    a memory that stores instructions, and
    a processor in communication with the memory and operable to execute the instructions to implement a method of calibrating a prism set of the LIDAR device including at least a first prism and a second prism, the method comprising:
        obtaining a plurality of points indicative of a surface shape of a surrounding object;
        evaluating a cost function that accounts for a change of the surface shape of the surrounding object using the plurality of points;
        determining a relative bias in the prism set using the cost function, wherein the relative bias is a difference between a rotational deviation of the first prism and a rotational deviation of the second prism; and
        causing, based on the relative bias, a compensation for an estimation error in an estimation of the surface shape of the surrounding object.

12. The system of claim 11, wherein the determining of the relative bias includes minimizing the cost function.

13. The system of claim 1, wherein the evaluating the cost function includes, for each point of the plurality of points:
    determining a normal vector of the point, on the surface of the surrounding object as measured by the controller using the detected light; and
    comparing the normal vector of the point with a normal vector of an adjacent point to the point.

14. The system of claim 13, wherein the adjacent point is temporally adjacent to the point.

15. The system of claim 13, wherein the adjacent point is spatially adjacent to the point.

16. The system of claim 13, wherein the evaluating of the cost function includes excluding the point in response to a determination that an angle between the normal vector of the point and the normal vector of the adjacent point exceeds a predetermined threshold.

17. The system of claim 11, further comprising determining a collective bias in the prism set, the collective bias being a rotational deviation of the prism set.

18. The system of claim 17, wherein the determining the collective bias includes identifying a reference object in the plurality of points.

19. A method of calibrating a light detection and ranging (LIDAR) device, comprising:
    obtaining a plurality of points indicative of a surface shape of a surrounding object;
    evaluating a cost function that accounts for a change of the surface shape of the surrounding object using the plurality of points;
    determining a relative bias between the first prism and the second prism based on the normal vectors of the plurality of points, wherein the relative bias is a difference between a rotational deviation of the first prism and a rotational deviation of the second prism; and
    causing, based on the relative bias, a compensation for an estimation error in an estimation of the surface shape of the surrounding object, wherein the determining of the relative bias includes minimizing the cost function.

* * * * *